Patented May 11, 1943

2,318,753

UNITED STATES PATENT OFFICE 2,318,753

CERAMICS

Willard K. Carter, Columbus, Ohio, assignor to National Aluminate Corporation, Chicago, Ill., a corporation of Delaware No Drawing. Application December 1, 1939, Serial No. 307,047

11 Claims. (Cl. 106—73)

This invention relates to ceramic articles and has for an object improved ceramic articles produced from argillaceous materials in a new and novel manner.

A step in the production of ceramic articles such as bricks, pottery, porcelain ware, and the like is the incorporation of water with mixtures containing argillaceous materials such as clay, kaolin, and the like, to form a plastic mass. Fillers such as grog, feldspar, talc and the like may or may not be used. The mass may then be dried and fired in order to produce the desired finished ceramic product in accordance with well-known processes. In order to increase the workability of the plastic mass prepared from the clay or to vary the properties of the final product, it has been found that certain substances may be incorporated into the plastic mass prior to the drying operation to produce a desired effect. Also, under certain conditions, it may be desirable to add certain minerals or mineral salts to provide fluxing agents which serve to bond the particles of the ceramic article, whereby its finished strength is materially increased.

The plasticity characteristics of the undried plastic mass may often be somewhat increased by the addition of various materials such as organic plasticizers or the gelatinous precipitates of certain metal hydroxides, or by alkalis or such chemicals which react as electrolytes.

The improvement of the plasticity characteristics of the undried clayey mass has become desirable in those processes wherein the clay is plasticized with only a comparatively small quantity of water, and the mass is formed into the desired shape by the so-called dry press method. It is often desirable to extrude the plastic mass through a suitable orifice in order to form the desired product. In such cases the plasticity of the mass becomes extremely important, and it is desirable that these characteristics be improved without increasing the water content to any appreciable extent.

It has been discovered, in accordance with the present invention, that the plasticity characteristics of a raw ceramic mass may be improved to a marked degree by the incorporation therewith of a substance which may be selected from the group of substances comprising the zeolite gels in their undried, hydrous form. The zeolite gels are jelly-like masses which may be formed from solutions of alkaline silicates and a suitable jelly-forming solution such as alum or sodium aluminate. The gels produced by the action of these ingredients are clearly to be distinguished from ordinary water-glass or from the flocculent precipitates of certain metal hydroxides such as aluminum hydroxide, magnesium hydroxide, iron hydroxide, and the like. The gel may be produced by thoroughly mixing solutions of sodium silicate and sodium aluminate. The mixed solution, after standing for a few minutes at room temperature, spontaneously sets to a firm jelly-like mass. It is desirable that the concentrations of the original solutions be so regulated that the resulting gel contains from about 3% to about 10% of solids. A gel having a solids content of about 5.5% has been found to be satisfactory. It may be desirable that the solids content of the gel be increased to between about 15% and 25% before it is incorporated with the argillaceous material. This may be accomplished by removing a portion of the water from the gel by syneresis and/or filtration or drying.

It is desirable that the jelly-like characteristics of the zeolite gel be retained even when a portion of the water is removed therefrom.

A method for producing a zeolite gel which is useful in the process of the present invention may be as follows: One part by weight of a sodium aluminate solution having a specific gravity of 1.42 and containing 20% $Na_2O$ and 20% $Al_2O_3$ is dissolved in about 15 parts of water to form solution A. Two parts of a sodium silicate solution of a specific gravity of 1.40 and containing 30% $SiO_2$ and 8% $Na_2O$ are dissolved in another 15 parts of water to form solution B. Solutions A and B are then mixed together rapidly at room temperature with vigorous agitation. The mixture thus produced sets to a firm gel or jelly after a period of about one to three minutes. This gel is then mechanically broken down by a suitable means and is then subjected to either pressure or suction filtration, whereby a solid gel filter cake will be produced. The solid portion of the gel prepared in accordance with the above procedure has a formula which will approximate $Na_2O.Al_2O_3.5SiO_2$.

It will, of course, be readily recognized that zeolite gels may be prepared in accordance with methods other than that which has been described immediately above. Likewise, other types of zeolite gels having different compositions may be produced. For example, a suitable gel may be prepared from alum and sodium silicate. Before incorporation with the argillaceous material, it may be desirable in certain instances to thoroughly wash excess alkali from the gel when it is prepared in accordance with the method suggested above. This may be accomplished by straight washing of the gel with water before, after or during the filtration operation. The excess free caustic present in the gel is thereby removed.

Under certain conditions it has been found desirable to incorporate an acid or neutral gel with the argillaceous material in place of the basic gel produced in accordance with the method described above. These acid or neutral zeolite gels may be produced by forming the gel from solutions having a composition which will preclude the presence of excess alkali in the gel. Such a gel may be prepared from sodium silicate and alum.

It is also possible to neutralize an alkaline gel by the careful addition thereto of an acid such as hydrochloric or sulfuric. Care must be taken, however, to add the acid in dilute solutions. It is preferable to break the gel into a slurry and add the dilute acid with constant agitation in order to prevent the acid from dissolving a portion of the gel itself. Before the direct acid treatment of an alkaline gel, it may be desirable first to remove a portion of the excess free alkali contained within the gel by means of washing and filtration.

The gel produced in accordance with any of the methods described above may have a solids content ranging from 15% to 25%, depending upon the characteristics of the original gel and the partial dehydration treatment to which it was subjected. In accordance with this invention, the still hydrous, water-containing gel may be incorporated with clay or other argillaceous material and water to form a plastic mass which may be shaped, dried, and fired in order to produce the desired ceramic product. Only small portions of the gel are necessary in order to produce the desired results. It has been found that 0.5% of gel incorporated with the clay may be sufficient to give satisfactory results. However, if desired, the amount of gel added to the argillaceous material may range up to about 5.0% or 10.0% without adversely affecting the ceramic product.

When a zeolite gel is incorporated into a slip of argillaceous material in accordance with the present invention and the slip is subsequently processed and the resulting ceramic shapes dried and fired, a product results which has a greatly increased strength. The gel addition produces a pronounced fluxing action which results in the production of a stronger ceramic material. The presence of the small quantities of gel incorporated in ceramic slips also decreases the dry shrinkage and greatly increases the dry strength of the unfired intermediate product. This is very important from the points of view of the improvement effected in the ultimate quality of the product and lower than normal processing losses due to cracking and warpage.

Likewise, a gel incorporated into a stiff kaolin or plastic clay composition, capable of being molded by the so-called dry press method, facilitates the molding procedure, since the workability of the stiff mass is greatly increased by the addition of the small amounts of gel. The gel also has a tendency to decrease the warpage of the product during the firing process.

It will, of course, be evident to those skilled in the art that various types of ceramic materials may be prepared from argillaceous substances in accordance with the teachings of the present invention. A great number of formulae and processes have been used in the past for the production of various types of ceramic articles. It is intended that the scope of the present invention be extended to include all of the processes which are well known in the art. It is also intended that various types of zeolite gels may be employed in the manufacture of the ceramic articles or materials prepared in accordance with the present invention. It may be necessary in certain cases to experiment and determine by empirical methods the optimum concentrations of a particular zeolite that are desirable for incorporation with any particular type of clay substance. Likewise, it may be desirable to vary the properties of the final product by incorporating zeolites having different compositions into the argillaceous mass. For example, an alkaline-reacting zeolite gel may produce slightly different results under certain conditions than will an acid or neutral zeolite gel.

The washed zeolite gel prepared in accordance with the specific example given above contains aluminum oxide and silica in a molecular ratio of about 1:5. This mixture will fuse at about 930° C. If the alumina-silica ratio is 1:3, the fusion point is about 1165° C. The fusion point of the solid mixture in a gel having an alumina-silica ratio of 1:2 is about 1200° C. It may be desirable to select a zeolite whose solid mixture has a fusion point corresponding to the firing temperature of the ceramic article being produced. Thus, the selection of the zeolite gel may under certain circumstances depend upon the temperature of firing of the ceramic article.

The gel may be incorporated with the argillaceous material in any practicable manner. For example, it may be first disintegrated by suitable mechanical means and then stirred with the argillaceous material either before or after the addition of water. It may also be incorporated in the form of large particles or in the form of a slurry into the various mills which may be employed for working up the plastic mass preliminary to the drying operation. Under certain conditions it has been found desirable to add small quantities of clay to the gel during the process of manufacture.

While a particular embodiment of this invention is shown above, it will be understood, of course, that the invention is not to be limited thereto, since many modifications may be made; and it is contemplated, therefore, to cover any such modifications as fall within the true spirit and scope of this invention as defined by the appended claims.

I claim:

1. A process of producing ceramic articles which comprises the step of incorporating a hydrous zeolite gel with ceramic raw materials.

2. The process of producing ceramic articles which comprises incorporating a hydrous zeolite gel with ceramic raw materials, shaping the resultant mixture, and firing the same.

3. The process of producing ceramic articles which comprises the step of incorporating a hydrous zeolite gel with clay.

4. The process of producing ceramic articles which comprises incorporating a hydrous sodium-aluminate-sodium-silicate zeolite gel with an argillaceous material, shaping the resultant mixture, and firing the same.

5. The process of improving the properties of ceramic ware which comprises the step of incorporating therewith a hydrous zeolite gel during the process of manufacture.

6. The process of producing ceramic articles which comprises preparing a slip from a finely comminuted argillaceous material and water, incorporating therewith a freshly formed alkaline-reacting zeolite gel, removing a portion of the water from the resultant mass, shaping the mass, drying it, and heating it to firing temperatures.

7. A process of producing a ceramic article which comprises incorporating a hydrous zeolite gel with an argillaceous material, shaping the resultant mixture and firing the same, said gel being incorporated into the argillaceous material in such an amount as to provide less than about 1% of the total solids in the formed ceramic article.

8. The process of improving the properties of ceramic ware which comprises the step of incorporating therewith an alkaline-reacting hydrous zeolite gel during the process of manufacture.

9. In a process of producing ceramic articles, the step which comprises incorporating a neutral hydrous zeolite gel with clay.

10. The process of improving the properties of ceramic ware which comprises the step of incorporating therewith an acid-reacting hydrous zeolite gel during the process of manufacture.

11. In a process for producing ceramic articles, the step which comprises incorporating a zeolite gel with ceramic raw materials, said gel having between 75% and 85% water content.

WILLARD K. CARTER.